United States Patent
Misra et al.

(10) Patent No.: US 11,586,811 B2
(45) Date of Patent: Feb. 21, 2023

(54) MULTI-LAYER GRAPH-BASED CATEGORIZATION

(71) Applicant: Capital One Services, LLC, McLean, VA (US)

(72) Inventors: Anindya Misra, McLean, VA (US); Cindy Liu, McLean, VA (US); Milovan Milovanovic, McLean, VA (US)

(73) Assignee: Capital One Services, LLC, McLean, VA (US)

(*) Notice: Subject to any disclaimer, the term of this patent is extended or adjusted under 35 U.S.C. 154(b) by 459 days.

(21) Appl. No.: 16/835,688

(22) Filed: Mar. 31, 2020

(65) Prior Publication Data

US 2021/0303783 A1 Sep. 30, 2021

(51) Int. Cl.
| | | |
|---|---|---|
| *G06F 40/20* | (2020.01) | |
| *G06F 16/34* | (2019.01) | |
| *G06F 16/901* | (2019.01) | |
| *G06N 20/00* | (2019.01) | |
| *G06N 3/04* | (2006.01) | |
| *G06F 40/30* | (2020.01) | |
| *G06F 16/36* | (2019.01) | |

(52) U.S. Cl.
CPC ............ *G06F 40/20* (2020.01); *G06F 16/345* (2019.01); *G06F 16/367* (2019.01); *G06F 16/9024* (2019.01); *G06F 40/30* (2020.01); *G06N 3/0481* (2013.01); *G06N 20/00* (2019.01); *G06F 16/36* (2019.01)

(58) Field of Classification Search
CPC ........ G06F 40/30; G06F 40/20; G06F 16/367; G06F 16/36
See application file for complete search history.

(56) References Cited

U.S. PATENT DOCUMENTS

| | | | | |
|---|---|---|---|---|
| 2015/0205584 | A1* | 7/2015 | De Smet | G06F 8/31 717/114 |
| 2015/0269139 | A1* | 9/2015 | McAteer | G06F 40/30 704/9 |
| 2017/0372190 | A1* | 12/2017 | Bishop | G06F 40/295 |
| 2018/0075359 | A1* | 3/2018 | Brennan | G06N 5/022 |
| 2018/0102916 | A1* | 4/2018 | Chen | H04L 67/63 |
| 2018/0129959 | A1* | 5/2018 | Gustafson | G06N 20/00 |
| 2020/0294666 | A1* | 9/2020 | Stoilos | H04L 51/02 |
| 2021/0303783 | A1* | 9/2021 | Misra | G06F 40/44 |

* cited by examiner

*Primary Examiner* — Samuel G Neway
(74) *Attorney, Agent, or Firm* — Perkins Coie LLP

(57) ABSTRACT

A method may include a obtaining a first data model instance comprising an identifier string and a set of attributes associated with a set of attribute name strings. The method may include obtaining an ontology graph that includes a first label, a second label, and an association between them. The method may include using a prediction model to select the first label based on the first data model instance and determining the second label based on the relationship. The method may include determining a selected set of labels that includes the first label and the second label to associate with the first data model instance. The method may include associating the selected set of labels with the first data model instance in a dataset that includes a plurality of records, where each record is associated with a different data model instance.

18 Claims, 4 Drawing Sheets

MULTI-LAYER GRAPH-BASED CATEGORIZATION

FIELD

The invention relates to artificial intelligence and more specifically to natural language processing.

BACKGROUND

Modern information systems are often populated with vast quantities of data stored in data lakes. A significant amount of computations may occur to analyze the datasets stored in these data lakes. The efficient analysis and use of these datasets may be guided by a data catalog, which may provide information about the purpose, collection strategy, or other information associated with these datasets. The data catalog may be stored as its own set of records and may provide an efficient means of retrieving and using a plurality of datasets. Such efficiency and increased accuracy may be beneficial for a variety of enterprise-scale data retrieval and analysis operations.

SUMMARY

Aspects of the invention relate to methods, apparatuses, media, and/or systems for prioritizing and reconstructing information using natural language processing (NLP).

In some embodiments, a method may provide a means of updating a data catalog by predicting labels associated with the datasets listed in the data catalog. The method may include obtaining a dataset and using a set of neural network layers or other components of a prediction model to select a first label based on the values of the dataset. A second label may be selected based on an edge of an ontology graph that associates a first graph node representing the first label with a second graph node representing the second label.

Another set of neural network layers or other components of the prediction model may then be used to generate a summarization used in the data catalog based on the first and second labels. An additional set of neural network layers or other components of the prediction model may be used to determine whether a quality value of the summarization satisfies a quality threshold. If the quality value satisfies the quality threshold, the system may populate a record of the data catalog with the summarization in association with the dataset described above. Otherwise, the system may use a deep NLP method to generate a new summarization to associate with the dataset in the data catalog. In addition, the summarization and the quality value may be stored in the memory storage of a computing device.

In some embodiments, a method to populate a data catalog may include obtaining a first dataset or other data model instance. The method may also include obtaining an ontology graph having a first label, a second label, and a connection associating the two with each other. A prediction model may be used to select the first label based on the first dataset and select the second label based on the connection encoded in the ontology graph. The selected set of labels may be associated with the first dataset in a data catalog having a plurality of records, where each record identifies or is otherwise associated with a different dataset. The data catalog may then be used to access a data lake storing the dataset and may be useful for increasing data retrieval efficiency or accuracy.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Some data catalogs used to categorize or otherwise retrieve an instance of a dataset structured according to a data model ("data model instance") from a data lake may be populated using manual entry by the original data providers of the respective data model instance(s). The data catalog may include a dataset of records to access data model instances, where each record of the dataset may identify, link to, or otherwise be associated with a different data model instance. As the amount of data grows, data model instances may evolve in nature or purpose, and the data populating the data model instances may change in collection method or accuracy. For example, a data lake may evolve to include more than ten, more than a hundred, more than a thousand, or more than ten thousand data model instances. Furthermore, each data model instance may store between zero to hundreds of millions of records across more than one, more than ten, more than twenty, more than one hundred, or more than one thousand attributes.

As a result of the scale of the data involved in a data lake and the unending cumulative changes to a data lake via the datasets populating the data lake, mental processes used to originally populate a data catalog may become increasingly unsuitable for updating or maintaining the data catalog. The scale and cumulative changes of a data lake may decrease the reliability and speed of operations performed by users to retrieve data using a data catalog via a user interface or application program interface (API). Some embodiments described in this disclosure may provide improvements to a data catalog or its associated user interface that reduce or otherwise mitigate these decreases. These improvements may increase the speed and accuracy of a search operation associated with user attempts to retrieve a data model instance using a data catalog. Alternatively, or in addition, some embodiments may increase the accuracy of the results by adding additional tags or descriptors in association with a data model instance that may then be retrieved using a data catalog.

Figure 1:
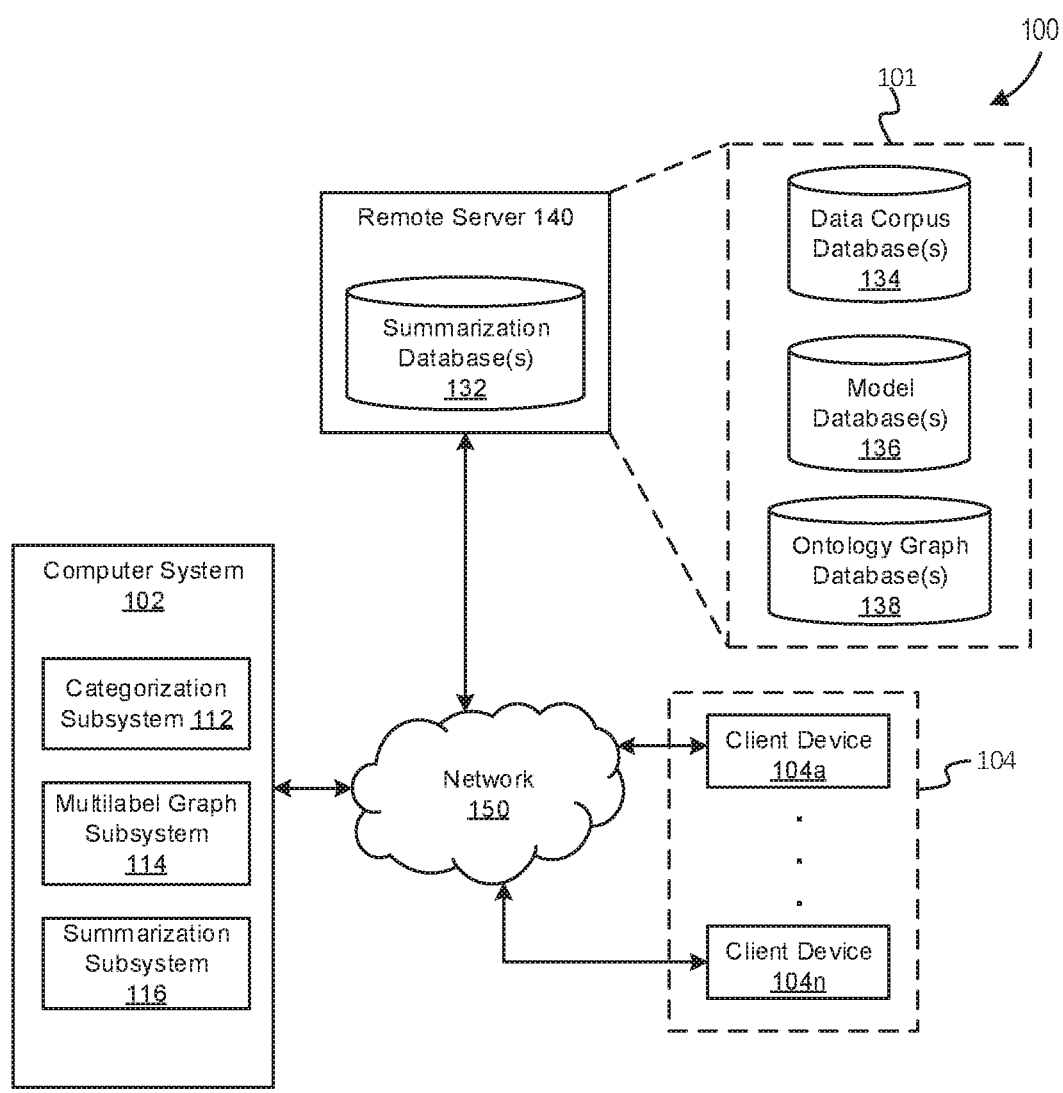
FIG. 1 shows a system for categorizing and labeling datasets, in accordance with one or more embodiments.

FIG. 1 shows a system 100 for categorizing and labeling datasets, in accordance with one or more embodiments. As shown in FIG. 1, the system 100 may include a computer system 102, client device 104 (or client devices 104a-104n), or other components. The computer system 102 may include a categorization subsystem 112, an ontology graph subsystem 114, a summarization subsystem 116, and/or other components. Each client device 104 may include one of various types of mobile computing devices, fixed computing devices, or other electronic computing devices. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models (e.g., neural networks or other machine learning models), other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, the system 100 may populate a data catalog with one or more summarization values associated with an instance of a dataset structured according to a data model ("data model instance") using machine learning models or ontology graphs. In some embodiments, the system 100 may use one or more natural language processing (NLP) models to categorize a data model instance with a set of labels based on text values or other values stored in or otherwise associated with the data model instance. In some embodiments, the NLP model may be used in conjunction with an ontology graph and be trained or otherwise updated to improve the categorization of data model instances with respect to accuracy and the testing requirements of downstream data analysis operations.

In some embodiments, the NLP model or categorization models used by the NLP model may include one or more neural networks or other machine learning models. As an example, neural networks may be based on a large collection of neural network nodes. Each neural network node of a neural network may be connected with many other neural network nodes of the neural network. Such connections can be enforcing or inhibitory in their effect on the activation state of connected neural network nodes. In some embodiments, each individual neural network node may include or otherwise use a summation function to combine the values of all its inputs together. In some embodiments, each connection (or the neural network node itself) may have a threshold function such that a set of inputs must surpass the threshold before the set of inputs propagates to other neural network nodes. These neural network models may be self-learning and trained, rather than explicitly programmed, and can perform better in certain problem-solving domains, as compared to traditional computer programs. In some embodiments, neural networks may include multiple layers (e.g., where a value traverses from front layers to back layers). In some embodiments, backpropagation techniques may be utilized by the neural networks, where forward stimulation is used to modify weights on the "front" neural network nodes. In some embodiments, stimulation and inhibition for neural networks may be more free-flowing, with connections interacting according to various other arrangements.

Subsystems 112-116

In some embodiments, the categorization subsystem 112 may be trained based on one or more data model instances obtained from a data corpus database(s) 134. The data corpus database(s) 134 may include one or more data corpora configured to store a plurality of data model instances. A data model instance may be a dataset stored in one of various data model formats, such as in an extensible markup language (XML) format, a Javascript object notation (JSON) format, a database data model format such as a SQL data model format, or the like. The data model instance may include an identifier string (e.g., a dataset name), a text descriptor, or a set of attributes. A text descriptor may be a multi-word description that includes information such as a target analysis model, which protocols the dataset are in compliance with, a level or domain associated with the dataset information, or the like. In some embodiments, the data corpus database(s) 134 may include a set of previously-labeled data model instances and a set of training labels for training a set of neural network models or other prediction models.

In some embodiments, one or more attributes of the set of attributes may be used as entity indices. For example, a data model instance may have the identifier string, "Security Breaches," have an associated text descriptor in the form of the multi-word description, "this dataset is a list of all security breaches for servers A-D," have a first attribute with the name "breach incident ID," a second attribute with the name, "breached resources," and have a third attribute with the name "data transferred during breach." The first attribute may be used as an index. While the data model instance described above includes three attributes and one index, other data models of data model instances may include more than one index or no index at all. For example, a second data model instance may include more than one attribute, more than five attributes, more than ten attributes, more than fifty attributes, or the like.

In some embodiments, the data models stored in the data corpus database(s) 134 may be used to train a summarization model stored in the model database(s) 136, where the data models may include a set of previously-validated summarization strings, set of previously-labeled data model instances, or set of training labels. For example, some embodiments may train a set of neural network layers of a prediction model using the previously-labeled data model instances as training inputs and the set of training labels as training objectives. In some embodiments, the number of data model instances stored within the data corpus database(s) 134 may include more than 100 data model instances, more than 1,000 data model instances, more than 1,000,000 data model instances, or the like. The data corpus database(s) 134 may also store other data associated with the data model instances, such as a set of training objectives, links to source data, images, metadata, known labels associated with data model instances, or the like.

The categorization subsystem 112 may label a data model instance using one or more labels encoded in or otherwise associated with an ontology graph, where the ontology graph may be obtained using the ontology graph subsystem 114. An ontology graph may be a graph that includes a set of graph nodes and a set of graph edges connecting the graph nodes. The ontology graph may be stored in a memory storage of a computer system using one or more data structures such as a set of arrays, a set of linked lists, object instances, or the like. The ontology graph subsystem 114 may retrieve an ontology graph from the ontology graph database(s) 138. In some embodiments, an ontology graph may be obtained without consideration for any outputs of the categorization subsystem 112. Alternatively, or in addition, the categorization subsystem 112 may provide one or more output labels, and the ontology graph subsystem 114 may obtain an ontology graph based on the output labels, where the output label is associated with a first graph node of the ontology graph. As further discussed below, the ontology graph may be used to determine a set of associated labels based on the set of graph nodes connected with the first graph node. As used in this disclosure, a first edge of an ontology graph that associates a first graph node with a second graph node may be described as associating a first label with a second label if the first graph node is associated with the first label and the second graph node is associated with the second label. Similarly, the first label may be described as being associated with the second label based on this first edge.

The summarization subsystem 116 may generate a summarization based on a data model instance, where the summarization may include a set of labels, a phrase, a sentence, a set of sentences, or the like. As further described below, the summarization subsystem 116 may use the set of ontology graphs provided by the ontology graph subsystem 114 to generate the summarization. In some embodiments, the summarization may include a set of labels directly associated with the graph nodes connected with the first graph node in the ontology graph in the form of a list or set of metadata tags. Alternatively, or in addition, the summarization may be generated with a set of machine-learning methods that use text values of a data model instance or labels associated with the ontology graph as inputs. In some embodiments, the summarization subsystem 116 may use a machine-learning method to assign word scores to words in a sequence of words using one or more word scoring systems. In some embodiments, the summarization may include phrases, sentences, paragraphs, or other natural language outputs using a text generation model such as an extractive summarization model or abstractive summarization model. For example, the summarization subsystem 116 may use models or model parameters stored in the model database(s) 138 to generate a summarization that includes two sentences. Example summarization models used may include recurrent neural networks, statistical models, point generation neural networks, transformers, or other models.

A summarization may be used to provide one or more tags that increase data retrieval efficiency. Alternatively, or in addition, a summarization may be used as a multi-word description of a text descriptor to indicate a property or status of the data model instance. In some embodiments, the summarizations may be useful for retrieving and correctly using data from an enterprise-wide data lake. By using values from one or more ontology graphs or one or more summarizations, the cataloging system may increase operational efficiency, reduce or remove the need for manual data entry, increase data reliability by increasing the uniformity of dataset labeling operations. In addition, the determined summarizations may be used to prevent inappropriate use of one or more datasets during data-harvesting operations.

Figure 2:
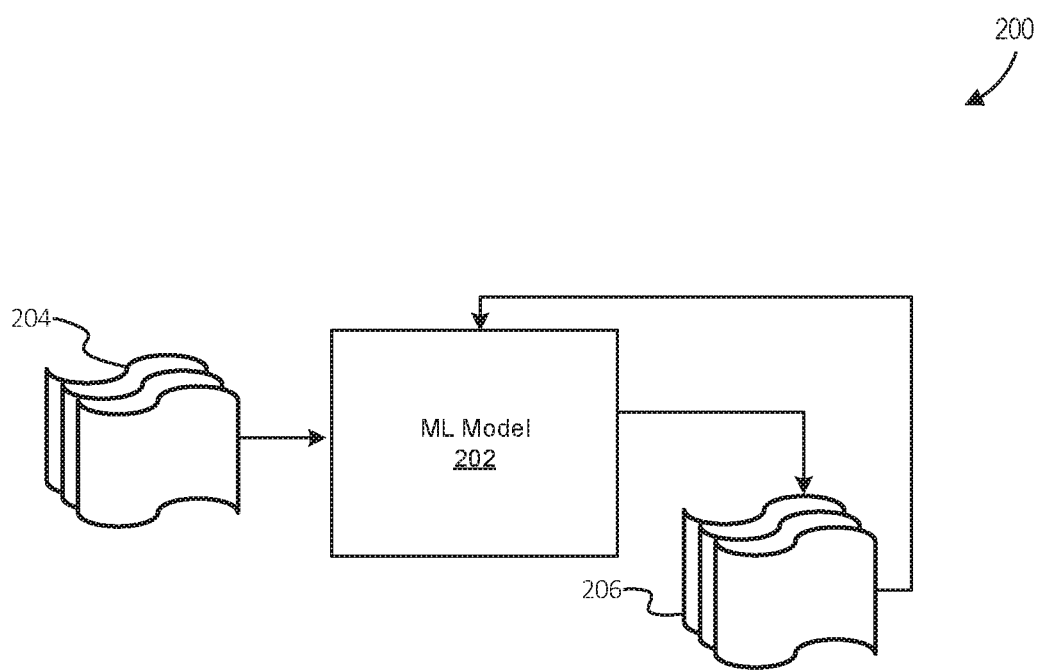
FIG. 2 shows a machine learning model configured to associate data model instances with labels and generate summarizations, in accordance with one or more embodiments.

As an example, FIG. 2 shows a machine learning model 202 configured to associate data model instances with labels and generate summarizations, in accordance with one or more embodiments. A machine learning model 202 of an NLP model or a categorization model may take inputs 204 and provide outputs 206. In some embodiments, outputs 206 may be fed back to the machine learning model 202 as input to train the machine learning model 202 (e.g., alone or in conjunction with user indications of the accuracy of the outputs 206, labels associated with the inputs, or with other reference feedback information). In some embodiments, machine learning model 202 may update its configurations (e.g., weights, biases, or other parameters) based on its assessment of its prediction (e.g., outputs 206) and reference feedback information (e.g., user indication of accuracy, reference labels, or other information). In some embodiments, where machine learning model 202 is a neural network, connection weights may be adjusted to reconcile differences between the neural network's prediction and the reference feedback.

In some embodiments, one or more neurons (or neural network nodes) of the neural network may receive their respective errors are sent backward through the neural network to them to facilitate the update process (e.g., backpropagation of error). Updates to the connection weights may, for example, be based on the magnitude of error propagated backward after a forward pass has been completed. In this way, for example, the machine learning model 202 may be trained to generate better predictions when labeling a data model instance or performing some other operation.

Figure 3:
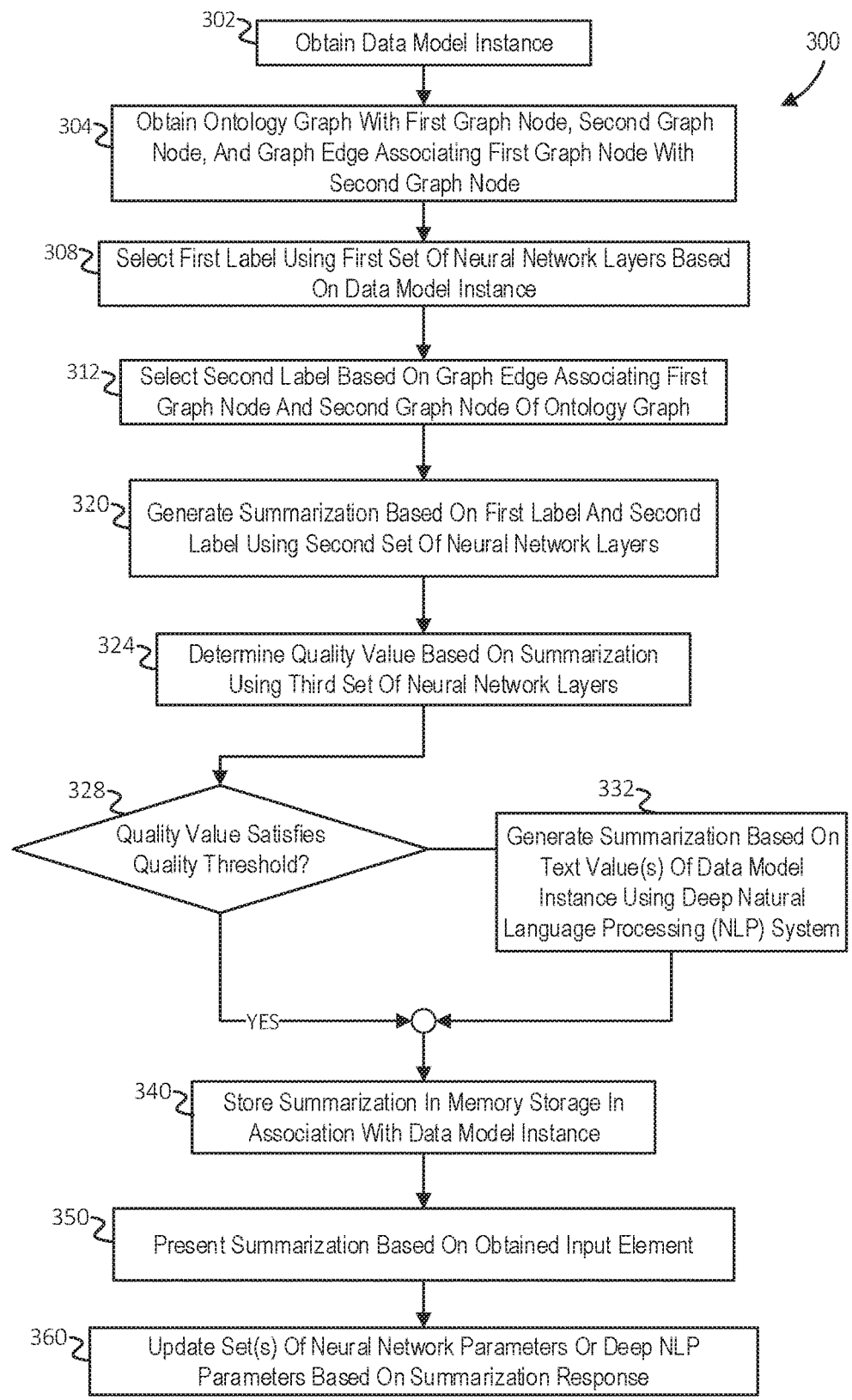
FIG. 3 shows a flowchart of operations to prioritize and reconstruct information, in accordance with one or more embodiments.

FIG. 3 is an example flowchart of processing operations of methods that enable the various features and functionality of the system, as described in detail above. The processing operations of each method presented below are intended to be illustrative and non-limiting. In some embodiments, for example, the methods may be accomplished with one or more additional operations not described, and/or without one or more of the operations discussed. For example, with respect to the method 300, some embodiments may perform operations of the method 300 without the operations of blocks 324 or 328. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Operations of the method 300 may begin at operation 302. In operation 302, a data model instance may be obtained. The data model instance may be obtained immediately during the initial data input of the values of the data model instance. For example, the data model instance may be obtained during a real-time data extraction performed using the ECL programming language right after ingesting the data model instance. Alternatively, or in addition, the data model instance may be obtained asynchronously with respect to its creation or modification. For example, the data model instance or may be obtained after the data model instance is obtained by more than one minute, more than one hour, more than one day, more than one month, more than one year, or the like. The data model instance may include an identifier string, a set of attributes, a pre-written text descriptor, an initial set of labels, or the like. The data model instance may be stored in an unorganized data lake or may be pre-sorted by an existing data catalog.

In the operation 304, an ontology graph may be obtained, where the ontology graph includes a first graph node, a second graph node, and a graph edge associating the first graph node with the second graph node. The ontology graph may be stored in a memory in various ways. For example, the ontology graph may be stored as a set of linked lists, an array of pointers representing graph nodes and an array of graph edges associating the pointers with each other, a set of hash tables, various other data structures encoding graph nodes and associations between graph nodes, or the like. In some embodiments, the graph edges may be directional, where a direction of an edge may be indicated by assigning a first listed element of a sublist as a tail graph node and a second listed element of the sublist as a head graph node, and where the directionality of the graph edges may represent an equivalency relationship or a non-equivalency relationship, as further described below.

In some embodiments, the method may include obtaining or otherwise accessing a plurality of ontology graphs. Each ontology graph in the plurality of ontology graphs may be different from each other and may be associated with different domains. For example, a first ontology graph may associate the label "KYT" with the label "Kangaroo Yak Turmeric," and a second ontology graph may associate the label "KYT" with the label "country of origin." A subset of the plurality of ontology graphs may be selected for use when determining a summarization or a label for a data model instance. In some embodiments, the selection of the ontology graphs may be based on the data model instance. For example, a first ontology graph may be associated with an ontology graph label "business," and the first ontology graph may be provided in response to a search for ontology graphs related to the label "business." The selection of different ontology graphs based labels may increase the versatility of some embodiments because different ontology graphs may be better suited for different domains.

Each respective graph node of the ontology graph may encode or otherwise be associated with a respective label. For example, a set of graph nodes of an ontology graph may be encoded in a dictionary, such as "[1: "neural network", 2: "neurons", 3: "data munging" ], where a set of graph edges of the ontology graph may be represented by an array of arrays representing [[1,2], [2,1], [3,1]]. The first listed element of the set of graph edges may indicate a first edge connecting the graph node associated with the label "neural network" to the graph node associated with the label "neurons," a second edge connecting the graph node associated with the label "neurons" to the graph node associated with the label "neural network," and a third edge connecting the graph node associated with the label "data munging" to the graph node associated with the label "neural network." In some embodiments, the first listed element and the second listed element may be shown to be reverses of each other, which may indicate an equivalency relationship between the two labels. Using this set of graph edges, a prediction system that categorizes a data model instance with one of the pair of labels "neurons" or "neural network" may also categorize the data model instance with the other label of the pair of labels, while a prediction system that categorizes a data model instanced with "neural network" is not directed to categorize the data model instance with the label "data munging."

In some embodiments, the ontology graph may itself be generated based on a data corpus. For example, a data corpus may include the data corpus database(s) 134 and may include a set of previously-written text descriptors. A computing system may assign word scores to the set of previously-written text descriptors using one or more word score determination operations described further below and determine which sets of words are related based on a set of word scores. A set of ontology graphs may then be generated based on the set of related words.

In an operation 308, a first label may be selected using a first set of neural network layers based on the data model instance. The first set of neural network layers may be used as a part of a prediction model to predict a context based on an identifier string, multi-word description or other text descriptors, set(s) of attribute values, or other values stored in or otherwise associated with a data model instance. In some embodiments, the context may include a word or phrase that is one of the labels of the ontology graph. Alternatively, or in addition, the context may include a word or phrase that is first used to search for an ontology graph. Values of the data model instance, determined from the data model instance, or otherwise associated with the data model instance may be used by the prediction model to select the first label. For example, the identifier string, data model instance summary, set of attribute name strings, set of attribute descriptors, or data format of the attributes may be used as inputs for the prediction model to categorize a data model instance.

As described above, some embodiments may include a trained prediction model that may use a set of attribute descriptors associated with an attribute as an input to predict a label for a data model instance, where an attribute descriptor may include a phrase, sentence, or set of sentences describing an attribute. For example, the set of attribute descriptors of a data model instance may include the phrase "attribute attr1 was recorded by a web listener scheduled to operate every fifty milliseconds" and be associated with the attribute name "attr1." The prediction model may use an attribute descriptor of the data model instance as an input to select a first label. Furthermore, as described above, a trained prediction model may use one or more data formats of an attribute as an input(s) to predict the first label. In some embodiments, a data format of the attributes may include ways in which a date is recorded (e.g. "month/day/year" vs. "year-month-date") or a way in which a numeric value is entered (e.g. "100,000" vs. "100000") and may provide signals to the first set of neural network layers to select a first label. Furthermore, a trained prediction model may use one or more sets of attribute values associated with one or more attributes as an input(s) to predict the first label. A set of neural network layers of the prediction model may use various types of values based on one or more of the sets of attribute values as an input. For example, the trained prediction model may use a maximum value, minimum value, measure of central tendency (e.g. mean average, median, mode), measure of variance (e.g., standard deviation, variance, etc.), detected trend, or detected pattern of a set of attribute values to determine the first label.

In some embodiments, the prediction model may determine and use a set of attribute prioritization values associated with a set of attributes of a data model instance as a set of inputs for the prediction model or to modify the set of inputs for the prediction model, where an attribute prioritization value may be based on a usage value of an attribute. A respective usage value of a set of usage values may be correlated with or otherwise based on a count of times that the corresponding attribute values of the respective attribute are used or otherwise accessed within a duration of time or over the lifespan of the dataset. For example, some embodiments may use a prediction model to predict a first label for a data model instance, where the data model instance includes a first attribute and a second attribute. The first attribute may have a usage value equal to 85%, and the second attribute may have a usage value equal to 15%, where the usage values may represent a ratio representing the relative count of times that the values of the first and second attributes are accessed with respect to each other. In some embodiments, the attribute prioritization values may be equal to the attribute usage values. Alternatively, the attribute prioritization values may be binned into pre-determined weighting values, such as "2.0," "1.0," or "0.1" based on absolute or relative usage values of an attribute. Some embodiments may then multiply or otherwise combine values determined from an attribute name or attribute values by their corresponding attribute prioritization value when using a prediction model to determine the first label.

In some embodiments, the training data used to train a first set of neural network layers or other components of a prediction model may be updated based on an API message having with updated labels or based on responses from users. For example, a request that includes an update to a label may be sent to a data corpus database via an API. Obtaining the update may cause some embodiments to determine whether the updated label is associated with one or more training inputs (e.g., input data, training objectives, or the like) used for training a first set of neural network layers or other component(s) of a prediction model. In response to a determination that the updated label is associated with the set of training inputs for the first set of neural network layers, one or more neural networks or other learning models may be re-trained based on the updated label or associated updates to the set of training inputs. For example, a label may be updated by an API message that causes a change in the label name and a change in the label's association with a set of datasets such that a dataset originally associated with the label is no longer associated with the label. In response, a computing system may re-train one or more of the first set of neural network layers, a second set of neural network layers, or third set of neural network layers.

The first set of neural network layers being used as a prediction model to determine a first label may be part of a neural network, which may include various neural network models. Example neural network models may include convolutional neural networks, recurrent neural networks, transformer neural networks, encoder neural networks, long short term memory (LSTM) neural networks, or the like. For example, some embodiments may use a first layer of an LSTM neural network to determine that a data model instance having the identifier string "biweekly performance optimization schedule" with the set of attribute name strings "date," "computational asset use," and "pipeline use" may result in a first label of "IT infrastructure."

In some embodiments, the first set of neural network layers or other elements of a prediction model may include or otherwise be used as part of an ensemble learning model. As described further below, an ensemble learning model may include a set of weights associated with a set of different learning models. For example, using the prediction model may include determining a first output value using a first learning model based on a data model instance and determining a second output value using a second learning model based on the same data model instance. The first and second output values may be different due to different weights, learning architecture, or fundamental model differences between the first and second learning model. Using the ensemble learning model may also include determining a first weighted value and second weighted value by multiplying or otherwise combining the ensemble weights associated with the first and second learning models with their respective output values. These operations may be repeated for a third learning model, a fourth learning model, or any other number of learning models of the ensemble model. Using the ensemble model may then including summing or otherwise combining each weighted value to determine combined output value and determine a first label based on the combined output value.

In some embodiments, the first set of neural network layers may include a single layer of neural networks, where each layer includes a set of neural network nodes. The use of a single layer may decrease the time required to select the first label. Alternatively, the first set of neural network layers may include a plurality layers, which may increase the accuracy of label determination in comparison to the first layer. In some embodiments, the first set of neural network layers may include its own respective input and output layers or otherwise be usable as a standalone neural network. Alternatively, the first set of neural network layers may be part of a neural network that includes a second set of neural network layers to generate a summarization or a third set of neural network layers to determine a quality value, as discussed further below.

In an operation 312, a second label may be selected based on the graph edge associating the first label with the second label. In some embodiments, the method 300 may include accessing the ontology graph to select a set of associated labels, where each label is associated with a graph node of a set of graph nodes, and where each of the set of graph nodes is connected to a first graph node associated with the first label. Some embodiments may select the set of associated labels by searching through a set of graph edges of the ontology graph for a graph edge that is connected to the first graph node. The second label may then be selected from amongst a set of associated labels, each of which may be a value stored in otherwise associated with one of the set of associated graph nodes.

In some embodiments, operations may also include searching through a set of ontology graphs to determine a subset of ontology graphs based on the first label. In some embodiments, the ontology graph may be determined based on a keyword search with or without NLP methods. For example, some embodiments may select a first label "Networking," apply a rooting operation of an NLP pre-processing method to determine the rooted first label "network." Some embodiments may search through an index of labels to determine a subset of ontology graphs that include the first label or the rooted first label.

In some embodiments, the graph edges of an ontology graph may include or otherwise be associated with a set of likelihood values. For example, the likelihood value of an edge connecting the label "blue" and "color" may be equal to 84%, and the likelihood value of an edge connecting the labels "neural network" and "processor" may be equal to 25%. Various operations may be used to determine a likelihood value. In some embodiments, the respective likelihood values of a respective set of graph edges may be determined from a set of default values of an ontology graph. Alternatively, or in addition, the likelihood value of an edge associating two labels may be determined based on an occurrence rate between two labels in a data corpus. For example, the likelihood value associating the label "mechanical" with the label "electrical" may be based on the ratio by which the term "mechanical" appears in the same documents of a data corpus database as the label "electrical." Alternatively, or in addition, the likelihood value of an edge may be determined based on one or more user inputs. In some embodiments, the second label may be selected after a determination that the likelihood value of the edge associating the second label with the first label is greater than a likelihood threshold. For example, a computing system may determine that an edge associating the label "blue" with a first label "navy" has a likelihood value of 90% and that this likelihood value satisfies a likelihood threshold. In response, the computing system may select the label "blue" as the second label for one or more of the operations described further below.

In an operation 320, a summarization may be generated based on the first label and the second label using a second set of neural network layers. In some embodiments, the summarization may include a selected set of labels that include the first label and second label, where other elements of the selected set of labels may be determined using the second set of neural network layers. For example, after receiving the labels "neural network" and "data lake" as a first label and second label, respectively, a second set of neural network layers may be used to generate a summarization that includes the selected set of labels ["neural network"; "data lake"; "machine learning"; "language processing"; "backend infrastructure"], where the second set of neural network layers is trained to select or otherwise determine one or more output labels based on an input set of labels, where the selected set of labels may include either or both the input set of labels or output label(s). The second set of neural network layers may then predict one or more summarizations based on the selected set of labels. Furthermore, in some embodiments, a data model instance may be associated with a preset label based on a user action. Some embodiments may include operations to perform a determination of whether the selected set of labels includes the preset label. In response to a determination that the selected set of labels does not include the preset label, some embodiments may generate a tag associated with the preset label to indicate that the preset label is not in the selected set of labels. This tag may be useful to indicate that a dataset is outdated, mislabeled, or otherwise incorrect.

Alternatively, or in addition, the summarization may include an extractive written summarization. In some embodiments, values of a data model instance may be used inputs for a text generation model that includes the set of second neural network layers, where the values of the data model instance may include a pre-written text descriptor, a first label, a second label, a dataset name, or the like. Some embodiments may use a set of neural network layers to determine a representation of the data model instance. For example, the second set of neural network layers may include a two-layer neural network model (e.g., a Word2Vec model) to vectorize each word of a text descriptor into a vector and use the vectors as word scores of the representation. The second set of neural network layers may also include a neural network or neural network layer trained to vectorize phrases or sentences based on these word vectors into phrase scores or sentence scores. In some embodiments, the process may include using one or more trained neural networks to determine a summarization from the phrases or sentences based on the phrase or sentence scores.

In some embodiments, operations to determine an extractive written summarization may be performed using a text generation model that does not include any neural network layers. For example, some embodiments may determine a representation by using a pre-written text descriptor of the data model instance as an input(s) for operations such as computing a word frequency distribution, determining a set of topic words, performing latent semantic analysis, performing Bayesian topic modeling, or the like. In some embodiments, the extractive written summarization operations may include assigning scores to phrases, sentences, or other segments of a pre-written text descriptor of a dataset based on the representation. For example, if the representation includes a set of topic words, the score may indicate the degree to which a sentence mentions one or more of the set of topic words. Some embodiments may select a summary comprising a phrase, a sentence, a plurality of sentences, a paragraph, or the like based on the scores. For example, some embodiments may select the three sentences associated with the top three scores determined from a score assignment operation described above and use these three sentences as the summarization.

Alternatively, or in addition, the summarization may include an abstractive written summarization. Some embodiments may include a text generation model that provides an abstractive written summarization that may include words or phrases that are not present in a pre-written text descriptor of a data model instance. For example, a pre-written text descriptor for a data model instance may include the phrase, "this dataset is for internal computational metrics used by IT teams A and B" followed by five additional sentences approximately 40 words long, and the abstractive written summarization may replace this pre-written text descriptor with the statement, "dataset 'ComputeTime' lists 35,412 entries describing CPU usage time for on-premise facilities A and B between 20XX-01-01 and 20XX-02-01." Various neural-network-based abstractive summarization models may be used and may include the first label and the second label as inputs such that the abstractive written summarization includes the first label or the second label.

In some embodiments, the abstractive summarization model may include the second set of neural network layers in the form of an RNN. Using an RNN of the RNN abstractive summarization model may include determining a set of hidden state values based on a sequence of strings using an encoder neural network of the recurrent neural network. Each layer of the RNN may obtain, as an input, a hidden state value outputted from a previous layer of the RNN operating on a previous string in the sequence strings. For example, a first hidden state value computed by an RNN cell of the encoder neural network for a first string in a sequence of strings may be used as input for a second RNN cell of the encoder neural network to determine a second hidden state value for the next string in the sequence of strings. Some embodiments may use a decoder neural network of the sequence-to-sequence RNN model to determine each word of a summarization string based on the output of the encoder neural network. For example, the RNN abstractive summarization model may include using a decoder neural network to decode an output of the encoder neural network to generate a first word of a summarization as well as a first decoder hidden state. Some embodiments may then use the first decoder hidden state of the decoder neural network to generate a second word of the summarization in addition to a second decoder hidden state and proceed iteratively until each word of the summarization is generated using the decoder neural network. In some embodiments, the RNN abstractive summarization model may also include one or more attention values associated with some or all of the encoder hidden states to determine one or more words generated by the decoder neural network.

In some embodiments, use of an extractive or abstractive summarization model may include the use of a summarization template. In some embodiments, the summarization template may be selected based on the first label or second label. For example, a summarization template titled "Machine Learning Performance Template" may be selected in response to a selection of "machine learning" as a first label and "operations" as a second label. In some embodiments, the summarization template may include a specific set of pre-determined words, fillable fields that may be filled based on a selected set of labels, grammatically-limited elements to guide the generation of sentences having a specific sentence structure, or the like.

In an operation 324, a quality value may be determined based on the summarization using a third set of neural network layers. In some embodiments, the third set of neural network layers may be trained using a set of previously-validated summarization strings or other user-labeled data stored in a data corpus database, such as the data corpus database 134. As described above, some embodiments may re-train the third set of neural network layers in response to an update to one or more values used as training inputs used by the third set of neural network layers. In some embodiments, the quality value may be determined as a numeric value or a categorical value. For example, the quality value may include a percentage, a ratio, a three-tier ranking, or the like. In some embodiments, the trained third set of neural network layers may be used to provide the quality value based on the summarization provided by one or more of the operations described above, where the weights, biases, or hyperparameters of the third set of neural networks may be trained by data stored in the data corpus 134, updated labels, other user-provided responses, or the additional training data specific to an application profile.

The third set of neural network layers may be part of the same neural network as the first set of neural network layers or the second set of neural network layers. For example, the third set of neural network layers may receive outputs from the second set of neural network layers and may be able to provide output values used to update the second set of neural network layers via a backpropagation mechanism. Alternatively, or in addition, the third set of neural network layers may include its own input and output layers and may function as an independent neural network. For example, the third set of neural network layers may have an input layer that takes the output summarization of the second set of neural network layers as an input, process the input in a hidden layer of the third set of neural network layers, and provide outputs of the hidden layer to an output layer of the third set of neural network layers, which turn may provide a quality value as a final output of the third set of neural network layers.

Alternatively, or in addition, the quality value may be determined using other learning systems. In some embodiments, a clustering operation may be applied to the summarization to compare its features with other analyzed summarizations, where features may include a set of words, word sequences, sentence structure, etc. For example, some embodiments may cluster generated summarizations with known summarizations based on word vectors assigned to words in the summarization. Some embodiments may use a norm distance between a generated summarization and a known summarization or a centroid associated with the known summarization as a quality indicator.

In an operation 328, a determination may be made of whether the quality value satisfies a quality threshold. In some embodiments, satisfying the quality threshold with the quality value may include satisfying a numeric threshold with the quality value. For example, the quality value may be a confidence percentage such as 95%, and the quality threshold may be satisfied if the confidence percentage exceeds a numeric threshold, such as 90%. In some embodiments, satisfying the quality threshold with the quality value may include determining that a category value or boolean value of the quality indicator is one of a set of acceptable boolean or categorical values. For example, some embodiments may determine that the quality value satisfies the quality threshold if the quality value is the boolean value corresponding with "True." In some embodiments, user verification may also be implemented. For example, some embodiments may determine that a quality value of a summarization satisfies the quality threshold if a user confirms that the summarization is acceptable via a user interface.

In an operation 332, a summarization may be generated based on a set of text values in the data model instance using a deep NLP system. In some embodiments, generating the summarization may include encoding a sequence of text stored in a data model instance or otherwise associated with the data model instance into a set of word scores. In some embodiments, the deep NLP system may implement transfer learning operations or otherwise use a pre-trained NLP model to generate embedding vectors as word scores. Transfer learning operations may include using one or more parameters of a first machine learning system trained on a first set of data to categorize or otherwise make predictions for a second set of data. Using a deep NLP system may include using a trained global vectors (GloVe) model, a trained neural network model such as a trained word2vec model, a trained Embeddings from Language model (ELMo) model, or the like. For example, some embodiments may use ELMo and a trained LSTM network to provide word scores to represent words based on their relationship with the words around them (e.g., their context). By using a pre-trained system or performing other transfer learning operations, a deep NLP system may increase its efficiency and accuracy for correctly determining which text portions to extract or what words to use for an abstractive summary.

In some embodiments, the deep NLP system may include the use of a transformer-based NLP model such as an OpenAI Transformer model, Universal Sentence Encoder (USE) model, XLNet, or a Bidirectional Encoder Representations from Transformers (BERT) model to encode a sequence of text. A transformer-based NLP model may include one or more transformers, where a transformer may include an encoder portion or a decoder portion. For example, using a transformer-based model may include using a trained encoder that may encode each word of a sequence of words in parallel, where the encoding in parallel may allow the same word to be encoded into different embedding vectors based on their context. Furthermore, by using a transformer instead of a recurrent neural network, a transformer-based model may be faster to train or use. In some embodiments, additional operations may be performed, such as splitting words into subwords, word masking, or the like. For example, a deep NLP system using the BERT model may convert words in a sequence of words into a set of sub-words, mask a portion of the words being encoded (e.g. less than 5%, less than 15%, less than 25%, less than 50%, or the like) and train its model parameters to more accurately predict the words being hidden by the masks.

Once a text descriptor is processed into a set of encodings, various extractive or abstractive text summarization methods may be used. Some embodiments may use one or more labels determined from an ontology graph as inputs for a text summarization operation. For example, a text descriptor of a data model instance may include the text sequence "multi-agent transfers across entity domains," where the use of an ontology graph may result in the data model instance being associated with the label "domain optimization." The text descriptor may then be processed by a BERT model to generate an abstractive summary that includes the phrase "domain optimization."

In some embodiments, an NLP system may include multiple sets of trained parameters for a neural network, where each of the sets of trained parameters corresponds with a different knowledge domain. The set(s) of trained parameters selected for a summarization operation may be based on labels determined from the ontology graph. For example, the categorization of a text descriptor may result in a first label "clustering," which may be associated with a second label "unsupervised learning." In response, a set of trained parameters may be retrieved based on a search for trained parameters associated with the phrase "unsupervised learning." In some embodiments, the deep NLP system may use a neural network having at least three layers, at least five layers, at least ten layers, at least twenty layers, or the like.

In some embodiments, the deep NLP system may include combinations of multiple machine learning systems, such as learning systems combined as part of an ensemble learning system. As described above, an ensemble learning system may implement one or more techniques to combine different learning models. Example techniques include a stacking technique that includes building a new set of model parameters from constituent model results, a bagging technique that includes combining prediction results of multiple weak models trained on subsets of training data, a boosting technique that includes combining weak learning systems to form a strong learning system, some combination of bagging and boosting techniques, or the like. In some embodiments, the constituent learning systems of an ensemble method may be of the same type, such as a Random Forest of decision trees. Various other ensemble methods may be used, such as AdaBoost, Gradient Boosting, XGBoost, Light GBM, CatBoost, or the like. In some embodiments, the use of an ensemble learning system to generate vectors for use as word scores may reduce biases and other issues.

In an operation 340, the summarization may be stored in a memory storage in association with the data model instance. In some embodiments, the summarization may be stored in an entry of the data model instance. For example, the data model instance may include a property associated with the property name "machine-generated summarization" and, in response, the data model instance may populate the property. Alternatively, or in addition, the data model instance may be stored in an index of summarizations and may retrieve the index of summarizations during a search, where the index of summarizations may include a data catalog or be otherwise used as a data catalog. For example, a memory storage may store a database acting as a data catalog, where a record of the database may include a set of keywords, a summarization, and an identifier associated with the data model instance used to generate the summarization. Some embodiments may include operations to retrieve the summarization or its associated data model instance based on an index value of the record or the set of keywords associated with the record. In some embodiments, storing a selected set of labels in association with a data model instance may include storing a summarization in association with the data model instance, where the summarization is generated based on the selected set of labels.

In an operation 350, the summarization may be presented based on an obtained input element. In some embodiments, the input element may be obtained via a user interface or an API. For example, the input element "neuronal system" may be obtained from a request from a user by the user typing the input element into a data entry field. Alternatively, or in addition, the input element may be received as a request sent from an application via an API of a computing system such as the system 100. Some embodiments may present the summarization by causing some or all of the summarization to be displayed on an electronic device, such as an electronic computer screen, a tablet, a mobile computing device, or the like. By providing a summarization generated using one or more of the operations above, the system efficiency may be increased for when retrieving datasets, compliance errors may be reduced, and the accuracy of data analysis results may be increased.

In some embodiments, the summarization may be presented by auto-populating a text field with one or more words from the summarization. For example, after typing in the phrase "this dataset is for IT performance in KYT countries of origins," the keywords "dataset" and "IT performance" may be extracted, the acronym KYT may be expanded, and additional information may be provided in a summarization such as, 'this dataset relates to IT performance in know-your-customer countries of origin. It is reported monthly from the year 2001 to the year 2015 and includes the attributes 'average data transfer rates' and 'total data transferred on a monthly basis.'"

In some embodiments, the summarization may be presented by providing a name for an attribute, identifier string, or other value associated with a data model instance. In some embodiments, a computing system may auto-populate a set of attribute name strings with a set of proposed attribute name strings. For example, based on an identifier string of a data model instance and a text descriptor associated with the data model instance, a set of attribute names may be generated based on the summarization. Alternatively, or in addition, an attribute name may be proposed as a replacement or supplement for an existing attribute name. For example, a data model instance may have a first attribute with the first attribute name "Integrated MC." One or more operations listed above may then be performed, where the summarization may include a generated attribute name "Integrated Memory Chunks," and where the generated attribute name may be displayed as a possible replacement or addition to the first attribute name. In some embodiments, a value of the summarization may be directly associated with an attribute without replacing an attribute name. For example, an attribute name of an example data model instance may be "Attr1_values," and a computing system may associate this attribute with the label "labelTitle1" in a data catalog based on a summarization. Queries sent to the data catalog for datasets having the attribute "labelTitle1" may then return the example data model instance. Some embodiments that include this type of association may improve the validity and accuracy of searches for datasets in a data lake via a data catalog.

In some embodiments, a summarization may be presented by determining one or more entities for an entity role of a data model instance. In some embodiments, the summarization may include one or more entity names, where the entity name may be determined using a neural network or categorization system. For example, a prediction model may be trained to predict which entity form a set of entities has an "owner" role of a data model instance based on a title, a text descriptor, or other values of a data model instance. Furthermore, in some embodiments, one or more of the operations of the method 300 may be performed in response to receiving an input element. For example, after receiving an input element for a data model instance, some embodiments may perform the operation 308, the operation 312, the operation 320, the operation 324, the operation 328, and the operation 350 in response to receiving an input element, where the input element may be a title, text descriptor of the data model instance, or the like.

Some embodiments may generate a warning indicating that one or more values of a data model instance are not in compliance with a rule. For example, an embodiment may determine that a data model instance is listed as a "privacy-ensured" dataset, but that the data model instance includes an attribute title named "customer name." In response, the embodiment may generate a warning indicating that the data model instance is not in compliance with a privacy protocol.

In an operation 360, one or more of the sets of neural network parameters or deep NLP parameters may be updated based on a summarization response. In some embodiments, a user may provide a response to the summarization. The response may be provided in various ways and may include a re-written summarization, a Boolean value indicating whether a user considers the summarization to be accurate, a numeric or categorical value indicating user's assessment of the accuracy of the summarization, or the like. In some embodiments, updating one or more of the sets of neural network layers may include updating the weights, biases, or other parameters of a neural network that includes one or more of the above-mentioned set of neural network layers.

In some embodiments, the parameters of one or more of the neural networks or other systems described above may be updated at intervals longer than 1 minute, such as once per hour, once per day, once per week, once per month, once per year, or the like. For example, some embodiments may update the parameters stored in the model database 136 every month. In some embodiments, the parameters may be trained on a data corpus database such as the data corpus database 134, which may be updated with new records or modified records before or during one or more updating operations. Furthermore, in some embodiments, the parameters may be updated within 1 minute of receiving the summarization response. For example, after a user provides a rating indicating an accuracy of a text descriptor of the generated summarization, some embodiments may use the rating as a summarization response and re-train one or more parameters of the neural network layers or deep NLP system immediately after receiving the rating.

Figure 4:
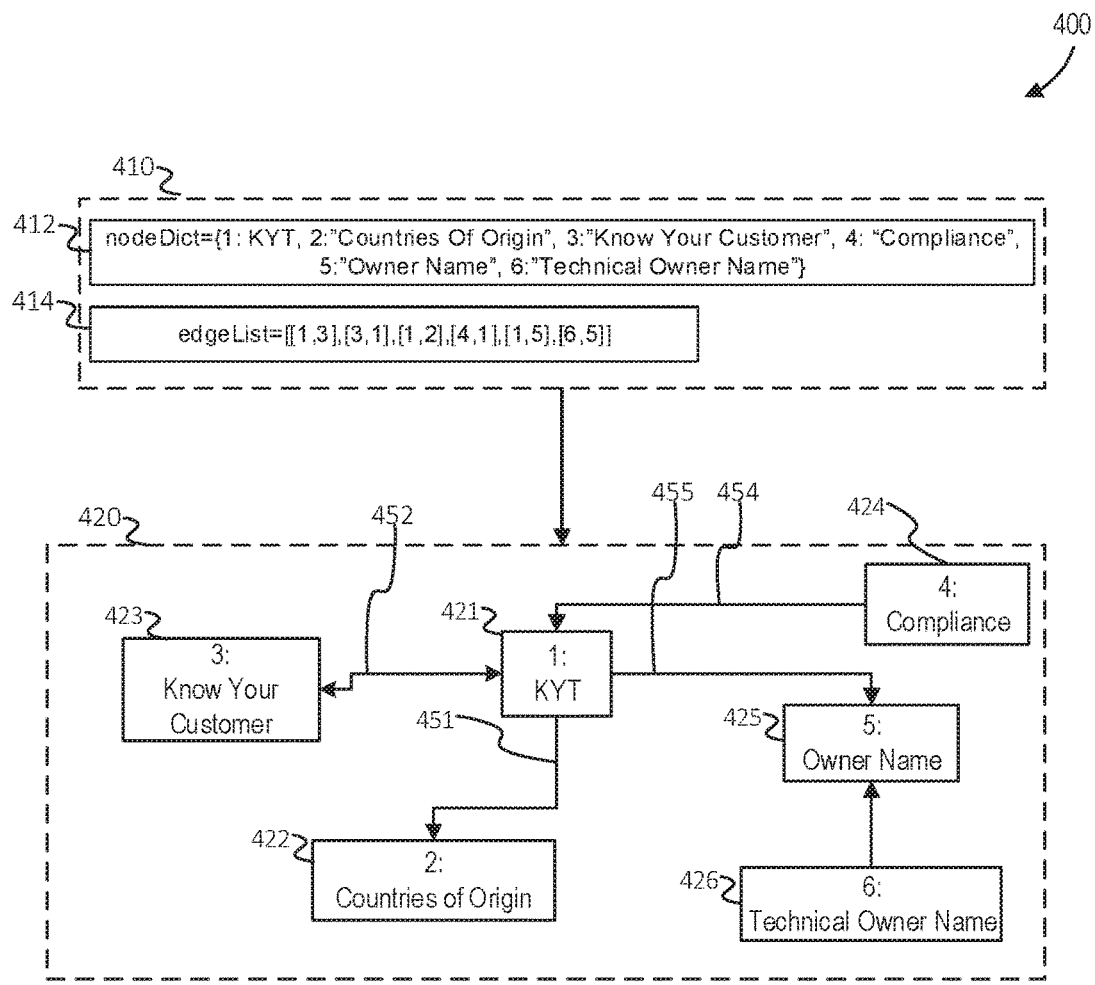
FIG. 4 shows a visual representation of an example ontology graph, in accordance with one or more embodiments.

FIG. 4 shows a visual representation of an example ontology graph, in accordance with one or more embodiments. In some embodiments, a graph may be stored in computer memory similar to the form represented by the dashed box 410, which includes a dictionary 412 to store the graph nodes of an ontology graph and a list 414 to store the graph edges of the ontology graph. The dictionary 412 is named "nodeDict" and is set to the dictionary "{1: kYT, 2:"Countries of origin", 3:"Know your customer", 4: "Compliance", 5:"Owner name", 6:"Technical owner name"}." The numeric values 1-6 may be dictionary keys, and the labels may be dictionary values associated with their respective dictionary keys. The list "edgeList" is set to "[[1,3],[3,1],[1,2],[4,1],[1,5],[6,5]]," where each sublist may be, include, or otherwise be associated with a graph edge associating two graph nodes. For example, the sublist [1,3] may be a graph edge associating the first graph node '1:"KYT"' with the third graph node '3: "Know Your Customer."' While the above shows graph nodes being stored as dictionary key-value pairs and graph edges being stored as lists, various other implementations are possible for storing graph nodes and graph edges of an ontology graph. For example, some embodiments may store graph nodes as objects, graph edges as pointers, graph edges as weights in a matrix, or the like.

As indicated above, some ontology graphs may be directed graphs, where a convention of the onotology graph may be to use the directionality of a graph edge as it points from a tail graph node to a head graph node as an indicator of associative relationships. Some embodiments may treat the directionality of a directed edge as a unidirectional association. For example, a directed edge pointing from a tail graph node to a head graph node may cause a computing system such as the system 100 to associate a head graph node with a data model instance in response to the data model instance being associated with the tail graph node, but will not cause the computing system to associate a tail graph node with a data model instance in response to the data model instance being associated with the head graph node.

The ontology graph shown in the dashed box 410 may be visually represented in the dashed box 420, which shows a first graph node 421 associated with a second graph node 422 by a unidirectional edge. As described above, the edge direction may be used to indicate one-way associations. For example, the directed edge 451 indicates that a data model instance associated with the label "KYT" may be associated with the label "Countries of Origin," but does not indicate that a data model instance associated with the label "Countries of Origin" is also associated with the label "KYT." Conversely, the bidirectional edge 452 associating the first graph node 421 with the third graph node 423 may indicate that a data model instance associated with the label "KYT" may be associated with the label "Know Your Customer" and that a data model instance associated with the label "Know Your Customer" is also associated with the label "KYT." Furthermore, the directed edge 454 associating the fourth graph node 424 with the first graph node 421 may indicate that a data model instance associated with the label "Compliance" may be associated with the label "KYT," but does not indicate that a data model instance associated with the label "KYT" is also associated with the label "Compliance." Furthermore, the directed edge 455 associating the fifth graph node 425 with the first graph node 421 may indicate that a data model instance associated with the label "KYT" may be associated with the label "Owner Name" but does not indicate that a data model instance associated with the label "Owner Name" is also associated with the label "KYT." Furthermore, as shown by the omission of any sublists representing an edge between the sixth graph node 426 and the first graph node 421, no edges are shown to connect the sixth graph node 426 with the first graph node 421. As shown by the visual representation shown in the dashed box 420, the set of associated graph nodes for the first graph node 421 may include the second graph node 422, the third graph node 423, and the fifth graph node 425, which indicates that the set of associated labels with the first label "KYT" include the labels "Countries of Origin," "Know Your Customer," and "Owner Name," respective.

In some embodiments, the various computers and subsystems illustrated in FIG. 1 may include one or more computing devices that are programmed to perform the functions described herein. The computing devices may include one or more electronic storages (e.g., data corpus database 134, model database 136, ontology database 138, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory, computer-readable storage media that electronically stores information. The storage media of the electronic storages may include one or both of (i) system storage that is provided integrally (e.g., substantially non-removable) with servers or client devices; or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems or other components. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems or other components described herein is for illustrative purposes, and is not intended to be limiting, as any of subsystems other components may provide more or less functionality than is described. For example, one or more of subsystems may be eliminated, and some or all of its functionality may be provided by other ones of the subsystems.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method comprising: obtaining a first data model instance comprising an identifier string and a set of attributes; obtaining an ontology graph comprising a first label, a second label, and an association between the first label and the second label; using a first prediction model to select the first label based on the first data model instance; selecting the second label based on the association between the first label and the second label in the ontology graph; and storing an association between the second label and the first data model instance in a memory storage.

2. The method of embodiment 1, the method further comprising: obtaining a set of previously-labeled data model instances and a set of training labels, wherein each previously-labeled data model instance of the set of previously-labeled data model instances is associated with a label of the set of training labels; and training the first prediction model using values from the set of previously-labeled data model instances as training inputs and the set of training labels as training objectives.

3. The method of any of embodiments 1-2, the method further comprising: obtaining a set of previously-labeled data model instances and a set of training labels, wherein each previously-labeled data model instance of the set of previously-labeled data model instances is associated with a label of the set of training labels; and training the first prediction model using values from the set of previously-labeled data model instances as training inputs and the set of training labels as training objectives.

4. The method of any of embodiments 1-3, wherein each attribute name string of a set of attribute name strings is associated with an attribute of the set of attributes, and wherein the method further comprising: determining a selected set of labels to associate with the first data model instance, wherein the selected set of labels comprises the first label and the second label; and associating the selected set of labels with the first data model instance in a dataset comprising a plurality of records, wherein each record is associated with a different data model instance.

5. The method of any of embodiments 4, further comprising: generating a first summarization string based on the selected set of labels using a first text generation model; determining a quality value based on whether the first summarization string satisfies a quality threshold using a set of neural network layers, wherein the set of neural network layers are trained using previously-validated summarization strings; and, responsive to a determination that the first summarization string does not satisfy the quality threshold, generating a second summarization string using a summarization model based on the identifier string, the set of attribute name strings, and a multi-word description associated with the first data model instance.

6. The method of any of embodiments 4-5, wherein the set of attributes is a first set of attributes, and wherein the method further comprises: obtaining a second data model instance comprising a second identifier string and a second set of attributes, wherein a first attribute from the first set of attributes shares an attribute name with a second attribute from the second set of attributes; and selecting the first label and the second label to be part of a second selected set of labels based on an association between the second data model instance and the first data model instance, wherein the second selected set of labels is associated with the second data model instance.

7. The method of any of embodiments 4-6, wherein the ontology graph is a first ontology graph, wherein the first data model instance is associated with a text descriptor comprising a plurality of words, and wherein the method further comprises: selecting a second ontology graph based on the first label or the second label, wherein the second ontology graph comprises a third label, a fourth label, and an association between the third label and the fourth label; and using a summarization model to generate a summarization string based on the text descriptor, the third label, and the fourth label.

8. The method of any of embodiments 4-7, wherein using the summarization model comprises: using a transformer model that takes the text descriptor as an input; determining a set of embedding vectors as word scores for words in the text descriptor; and selecting a first word associated with a word score based on a comparison of the word scores with each other, wherein the summarization string comprises the first word.

9. The method of any of embodiments 4-8, wherein the first data model instance comprises a set of attribute descriptors; each attribute descriptor of the set of attribute descriptors is associated with one of the set of attribute name strings; and using the first prediction model to select the first label comprises using the set of attribute descriptors as inputs for the first prediction model.

10. The method of any of embodiments 4-9, wherein the method further comprises obtaining a set of usage values, wherein each respective usage value of the set of usage values corresponds with a respective attribute of the set of attributes, and wherein, for each respective usage value of the set of usage values, the respective usage value correlates with a count of times that the respective attribute is accessed within a duration; and determining a set of attribute prioritization values based on the set of usage values, wherein each attribute prioritization value of the set of attribute prioritization values is associated with one of the set of attributes, and wherein using the first prediction model comprises selecting the first label based on the set of attribute prioritization values.

11. The method of any of embodiments 4-10, the method further comprising selecting a summarization template based on the first label; and generating a summarization string based on the summarization template.

12. The method of any of embodiments 4-11, wherein the first data model instance is associated with a preset label, the method further comprising: determining whether the selected set of labels includes the preset label; and in response to a determination that the selected set of labels does not include the preset label, generating a tag to indicate that the preset label is not in the selected set of labels.

13. The method of any of embodiments 4-12, wherein using the first prediction model to select the first label comprises using an ensemble learning model, wherein using the ensemble learning model comprises: determining a first value using a first learning model based on the first data model instance; determining a first weighted value based on the first value and a first weight associated with the first learning model; determining a second value using a second learning model based on the first data model instance; determining a second weighted value based on the second value and a second weight associated with the second learning model; and selecting the first label based on the first weighted value and the second weighted value.

14. The method of any of embodiments 4-13, the method further comprising generating a first summarization string based on values of the first data model instance using a summarization model; displaying the first summarization string on an electronic device; receiving a second summarization string from the electronic device, wherein the second summarization string is associated with the first data model instance; and responsive to receiving the second summarization string, training the summarization model using the second summarization string as a training objective.

15. The method of any of embodiments 4-14, the method further comprising: displaying the selected set of labels on an electronic device; receiving a value corresponding with a third label, wherein the third label is not in the selected set of labels; and training the first prediction model using the first data model instance as a training input, wherein a training objective associated with the first data model instance comprises the third label.

16. The method of any of embodiments 4-15, the method further comprising updating a label associated with the first data model instance with an update via an application program interface; determining whether the updated label is associated with a set of training inputs used during training of the first prediction model; and, in response to a determination that the updated label is associated with the set of training inputs, train the first prediction model based on the updated label.

17. The method of any of embodiments 4-16, wherein the data model instance comprises a multi-word description, a set of attribute name strings, and sets of attribute values, and wherein each of the sets of attribute values is associated with an attribute name string of the set of attribute name strings, and wherein the ontology graph comprises a set of graph edges, using the first prediction model comprises selecting the first label based on the identifier string, the multi-word description, and the set of attribute name strings using a first set of neural network layers, and wherein determining the second label comprises selecting the second label based on a first graph edge of the set of graph edges that associates the first graph node with the second graph node, and wherein associating the first label and the second label with the data model instance, and wherein the method further comprises: generating a summarization string using a second set of neural network layers, wherein the summarization string comprises the first label and the second label; determining a quality value based on whether the summarization string satisfies a quality threshold using a third set of neural network layers; and storing the summarization string and the quality value in a memory storage.

18. The method of embodiment 17, wherein selecting the second label comprises: determine a subset of graph edges from the set of graph edges, wherein each graph edge of the subset of graph edges is connected to the first graph node; determine a set of associated graph nodes, wherein each of the set of associated graph nodes is associated with the first graph node based on the subset of graph edges; for each respective graph node of the set of associated graph nodes, determine a respective likelihood value of the set of associated graph nodes, wherein the second graph node is one the set of associated graph nodes; and select the second label based on a determination that the second graph node is associated with a likelihood value that satisfies a likelihood threshold.

19. The method of any of embodiments 17-18, the method further comprising receiving a request for a record associated with the data model instance; and displaying the summarization string in response to the request for the record.

20. The method of any of embodiments 17-19, wherein the quality value indicates that the summarization string does not satisfy the quality threshold, and wherein the method further comprises, in response to a determination that the summarization string does not satisfy the quality threshold, generating a second summarization string based on the multi-word description; and in response to receiving a request for a record associated with the data model instance, displaying the second summarization string.

21. A non-transitory, computer-readable media storing instructions that, when executed by one or more processors, effectuate operations comprising the methods of any of embodiments 1 to 20.

22. A system for effectuating operations comprising the methods of any of embodiments 1 to 20.

What is claimed is:

1. A system for predicting a set of associated labels, the system comprising:
 a computer system that comprises one or more processors programmed with program instructions that, when executed, cause the computer system to:
  obtain a data model instance comprising an identifier string, a multi-word description, a set of attribute name strings, and sets of attribute values, wherein each of the sets of attribute values is associated with an attribute name string of the set of attribute name strings;
  obtain an ontology graph comprising a first graph node associated with a first label, a second graph node associated with a second label, and a set of graph edges;
  select the first label based on the identifier string, the multi-word description, and the set of attribute name strings using a first set of neural network layers;
  select the second label based on a first graph edge of the set of graph edges that associates the first graph node with the second graph node;
  associate the first label and the second label with the data model instance;
  generate a summarization string using a second set of neural network layers, wherein the summarization string comprises the first label and the second label;
  determine a quality value based on whether the summarization string satisfies a quality threshold using a third set of neural network layers; and
  store the summarization string and the quality value in a memory storage.

2. The system of claim 1, wherein the program instructions to select the second label further comprise instructions to:

determine a subset of graph edges from the set of graph edges, wherein each graph edge of the subset of graph edges is connected to the first graph node;

determine a set of associated graph nodes, wherein each of the set of associated graph nodes is associated with the first graph node based on the subset of graph edges;

for each respective graph node of the set of associated graph nodes, determine a respective likelihood value of the set of associated graph nodes, wherein the second graph node is one the set of associated graph nodes; and select the second label based on a determination that the second graph node is associated with a likelihood value that satisfies a likelihood threshold.

3. The system of claim 1, wherein the program instructions further comprise instructions to:

receive a request for a record associated with the data model instance; and display the summarization string in response to the request for the record.

4. The system of claim 1, wherein the quality value indicates that the summarization string does not satisfy the quality threshold, and wherein the program instructions further comprise instructions to:

in response to a determination that the summarization string does not satisfy the quality threshold, generate a second summarization string based on the multi-word description; and in response to receiving a request for a record associated with the data model instance, display the second summarization string.

5. A method comprising:

obtaining, by one or more processors, a first data model instance comprising an identifier string and a set of attributes, wherein each attribute name string of a set of attribute name strings is associated with an attribute of the set of attributes;

obtaining, by one or more processors, an ontology graph comprising a first label, a second label, and a first association between the first label and the second label;

using, by one or more processors, a first prediction model to select the first label based on the first data model instance;

determining, by one or more processors, the second label based on the first association of the ontology graph;

determining, by one or more processors, a selected set of labels to associate with the first data model instance, wherein the selected set of labels comprises the first label and the second label;

associating, by one or more processors, the selected set of labels with the first data model instance in a dataset comprising a plurality of records, wherein each record is associated with a different data model instance;

generating a first summarization string based on the selected set of labels using a first text generation model;

determining a quality value based on whether the first summarization string satisfies a quality threshold using a set of neural network layers, wherein the set of neural network layers are trained using previously-validated summarization strings; and responsive to a determination that the first summarization string does not satisfy the quality threshold, generating a second summarization string using a summarization model based on the identifier string, the set of attribute name strings, and a multi-word description associated with the first data model instance.

6. The method of claim 5, wherein the set of attributes is a first set of attributes, further comprising:

obtaining a second data model instance comprising a second identifier string and a second set of attributes, wherein a first attribute from the first set of attributes shares an attribute name with a second attribute from the second set of attributes; and selecting the first label and the second label to be part of a second selected set of labels based on an association between the second data model instance and the first data model instance, wherein the second selected set of labels is associated with the second data model instance.

7. The method of claim 5, wherein the ontology graph is a first ontology graph, wherein the first data model instance is associated with a text descriptor comprising a plurality of words, and wherein the method further comprises:

selecting a second ontology graph based on the first label or the second label, wherein the second ontology graph comprises a third label, a fourth label, and an association between the third label and the fourth label; and using a summarization model to generate a summarization string based on the text descriptor, the third label, and the fourth label.

8. The method of claim 7, wherein using the summarization model comprises:

using a transformer model that takes the text descriptor as an input;

determining a set of embedding vectors as word scores for words in the text descriptor; and selecting a first word associated with a word score based on a comparison of the word scores with each other, wherein the summarization string comprises the first word.

9. The method of claim 5, wherein:

the first data model instance comprises a set of attribute descriptors;

each attribute descriptor of the set of attribute descriptors is associated with one of the set of attribute name strings; and using the first prediction model to select the first label comprises using the set of attribute descriptors as inputs for the first prediction model.

10. The method of claim 5, further comprising:

obtaining a set of usage values, wherein each respective usage value of the set of usage values corresponds with a respective attribute of the set of attributes, and wherein, for each respective usage value of the set of usage values, the respective usage value correlates with a count of times that the respective attribute is accessed within a duration; and determining a set of attribute prioritization values based on the set of usage values, wherein each attribute prioritization value of the set of attribute prioritization values is associated with one of the set of attributes, and wherein using the first prediction model comprises selecting the first label based on the set of attribute prioritization values.

11. The method of claim 5, further comprising:

selecting a summarization template based on the first label; and generating a summarization string based on the summarization template.

12. The method of claim 5, wherein the first data model instance is associated with a preset label, the method further comprising:

determining whether the selected set of labels includes the preset label; and in response to a determination that the selected set of labels does not include the preset label, generating a tag to indicate that the preset label is not in the selected set of labels.

13. The method of claim 5, wherein using the first prediction model to select the first label comprises using an ensemble learning model, wherein using the ensemble learning model comprises:
determining a first value using a first learning model based on the first data model instance;
determining a first weighted value based on the first value and a first weight associated with the first learning model;
determining a second value using a second learning model based on the first data model instance;
determining a second weighted value based on the second value and a second weight associated with the second learning model; and
selecting the first label based on the first weighted value and the second weighted value.

14. The method of claim 5, further comprising:
generating a first summarization string based on values of the first data model instance using a summarization model;
displaying the first summarization string on an electronic device;
receiving a second summarization string from the electronic device, wherein the second summarization string is associated with the first data model instance; and
responsive to receiving the second summarization string, training the summarization model using the second summarization string as a training objective.

15. The method of claim 5, further comprising:
displaying the selected set of labels on an electronic device;
receiving a value corresponding with a third label, wherein the third label is not in the selected set of labels; and
training the first prediction model using the first data model instance as a training input, wherein a training objective associated with the first data model instance comprises the third label.

16. The method of claim 5, further comprising:
updating a label associated with the first data model instance with an update via an application program interface,
determining whether the updated label is associated with a set of training inputs used during training of the first prediction model; and
in response to a determination that the updated label is associated with the set of training inputs, train the first prediction model based on the updated label.

17. A non-transitory computer-readable media comprising instructions that, when executed by one or more processors, cause operations comprising:
obtaining a set of previously-labeled data model instances and a set of training labels, wherein each previously-labeled data model instance of the set of previously-labeled data model instances is associated with a label of the set of training labels;
training a first prediction model using values from the set of previously-labeled data model instances as training inputs and the set of training labels as training objectives;
obtaining a first data model instance comprising an identifier string and a set of attributes;
obtaining an ontology graph comprising a first label, a second label, and an association between the first label and the second label;
using the first prediction model to select the first label based on the first data model instance;
selecting the second label based on the association between the first label and the second label in the ontology graph; and
storing an association between the second label and the first data model instance in a memory storage.

18. The non-transitory computer-readable media of claim 17, the operations further comprising:
obtaining a corpus of previously-written text descriptors;
computing a set of word scores based on the corpus of previously-written text descriptors; and
generating the ontology graph based on the set of word scores.

* * * * *